US012711331B1

(12) United States Patent
Chollampatt Muhammed Ashraf et al.

(10) Patent No.: US 12,711,331 B1
(45) Date of Patent: Aug. 18, 2026

(54) FINE-TUNING LANGUAGE MODELS USING TARGET LANGUAGE VOCABULARY AND PARALLEL DATA FOR MACHINE TRANSLATION

(71) Applicant: Zoom Video Communications, Inc., San Jose, CA (US)

(72) Inventors: Shamil Chollampatt Muhammed Ashraf, Singapore (SG); Thanh-Le Ha, Karlsruhe (DE); Minh-Quang Pham, Karlsruhe (DE); Marco Turchi, Pergine Valsugana (IT); Linxiao Zeng, Singapore (SG)

(73) Assignee: Zoom Communications, Inc., San Jose, CA (US)

(*) Notice: Subject to any disclaimer, the term of this patent is extended or adjusted under 35 U.S.C. 154(b) by 166 days.

(21) Appl. No.: 18/647,701

(22) Filed: Apr. 26, 2024

(51) Int. Cl.
*G06F 40/44* (2020.01)
*G06F 40/284* (2020.01)
(Continued)

(52) U.S. Cl.
CPC ............ *G06F 40/58* (2020.01); *G06F 40/284* (2020.01); *G06N 3/0455* (2023.01)

(58) Field of Classification Search
CPC ....... G10L 15/063; G06F 40/44; G06F 40/49; G06F 40/51
See application file for complete search history.

(56) References Cited

U.S. PATENT DOCUMENTS 10,185,713 B1 * 1/2019 Denkowski ............. G06F 40/51
10,810,379 B2 * 10/2020 Zeng ..................... G06F 40/205
(Continued)

FOREIGN PATENT DOCUMENTS

CN 106708812 A * 5/2017 ............. G06F 40/58
CN 113505571 A * 10/2021 ............... G06N 3/08
WO WO-2021109679 A1 * 6/2021 ............ G06N 3/045

OTHER PUBLICATIONS

Alves , et al., "TOWER: An Open Multilingual Large Language Model for Translation-Related Tasks", Available online at: https://arxiv.org/pdf/2402.17733, Feb. 27, 2024, pp. 1-34.
(Continued)

*Primary Examiner* — Daniel Abebe
(74) *Attorney, Agent, or Firm* — Kilpatrick Townsend & Stockton LLP

(57) ABSTRACT

Techniques for fine-tuning language models using target language vocabulary and parallel data for machine translation are disclosed. In an example method, a computing device receives one or more words in a source language. The computing device translates the one or more words to a target language using a fine-tuned language model. The language model is fine-tuned by accessing a foundation language model pre-trained using source language training data and having a source language vocabulary. A set of tokens is added to the model representing a target language vocabulary. The model is further trained using target language training data. The model is further trained using parallel training data including a number of parallel elements each parallel element including words in the source language and the corresponding words in the target language. The computing device outputs the translated one or more words in the target language.

20 Claims, 8 Drawing Sheets

(51) Int. Cl.
*G06F 40/58* (2020.01)
*G06N 3/0455* (2023.01)

(56) References Cited

U.S. PATENT DOCUMENTS

| | | | | |
|---|---|---|---|---|
| 2007/0043553 | A1 * | 2/2007 | Dolan | G06F 40/47<br>704/2 |
| 2012/0029904 | A1 * | 2/2012 | Precoda | G10L 15/06<br>704/E11.001 |
| 2020/0117715 | A1 * | 4/2020 | Lee | G06N 3/09 |
| 2022/0343084 | A1 * | 10/2022 | Nagata | G06F 40/44 |

OTHER PUBLICATIONS

Xu , et al., "A Paradigm Shift in Machine Translation: Boosting Translation Performance of Large Language Models", Available online at: https://arxiv.org/pdf/2309.11674, Feb. 6, 2024, pp. 1-21.

* cited by examiner

FINE-TUNING LANGUAGE MODELS USING TARGET LANGUAGE VOCABULARY AND PARALLEL DATA FOR MACHINE TRANSLATION

FIELD

The present application generally relates to machine translation using machine-learning (ML) models, and more particularly relates to techniques for fine-tuning language models using target language vocabulary and parallel data for machine translation.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
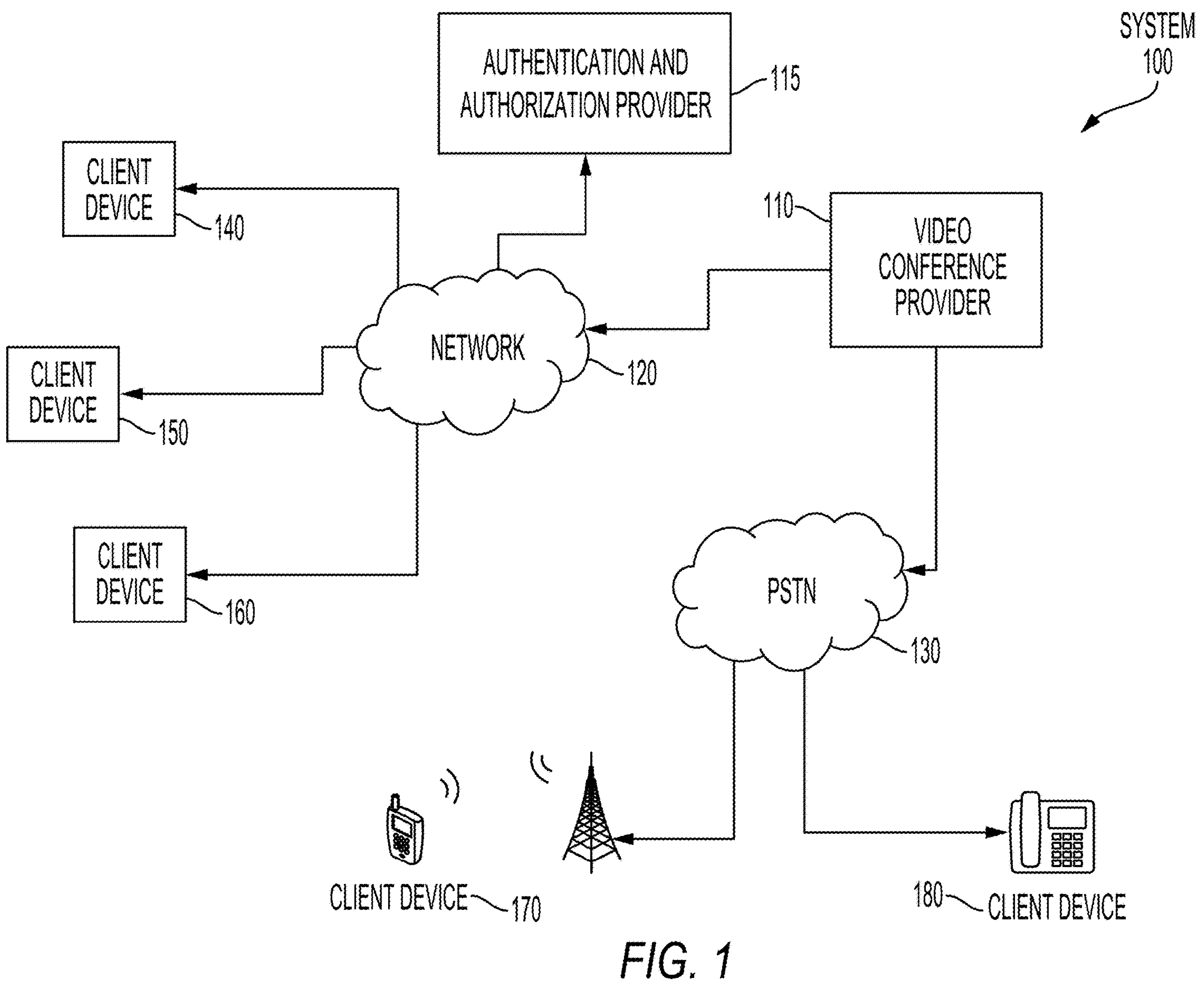
FIG. 1 shows an example system that provides videoconferencing functionality to various client devices, according to some aspects of the present disclosure.

Examples are described herein in the context of techniques for fine-tuning language models using target language vocabulary and parallel data for machine translation. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conferencing has become a fixture of modern communication. The proliferation of video conferencing technology has made it easier to connect with users across borders, but simultaneously highlights the difficulty of communicating when the participants lack a common spoken language. Machine translation technologies can enable users of video conferencing technology to receive translations for in-progress video conferences in real-time, translations for concluded video meetings, translations of chat messages or emails, and so on.

ML models such as language models are one example of a technology used to implement machine translation associated with video conferences and associated technologies. For example, a language model such as a large language model can receive natural language prompts in a source language that directs the large language model to translate a word or words to a target language. While relatively straightforward to implement, the translations obtained using this method may be inaccurate in some cases. For example, the training data used to train a language model may be predominantly data in one language (e.g., English) and may include considerably less training data in other languages (e.g., Russian). This problem can be particularly acute for low-resource languages which may have limited digital resources available for training language models (e.g., Irish or Maori).

Some existing approaches to improving the translation abilities of language models have involved fine-tuning language models using either additional training data from the target language or parallel training data, which is training data that includes text in the source language along with the corresponding translation in the target language. However, such approaches have fallen short of the capabilities and levels of accuracy needed in some practical translation scenarios. For example, existing approaches have used only relatively smaller amounts of parallel data resulting in a limited translation vocabulary. Indeed, the methods taken by some existing approaches have demonstrated that using additional parallel data beyond a certain point can result in reduced accuracy.

These difficulties can be addressed using techniques for fine-tuning language models using target language vocabulary and parallel data for machine translation. The following non-limiting example method is provided to introduce certain concepts. In the simplest case, a computing device configured for machine translation receives a word or words in a source language and outputs the word or words in a target language. In this example method, the word or words are translated using a fine-tuned language model in which the fine-tuning techniques used overcome the limitations of the existing approaches, resulting in a larger target language vocabulary and improved translation accuracy.

To fine-tune the language model, a foundation language model is accessed. The foundation language model may be a pre-trained language model intended to serve as a versatile base for further specialization through fine-tuning on domain-specific training data. For example, a foundation language model can be further trained or fine-tuned using additional training data in conjunction with conventional methods for language model training. Alternatively, a foundation language model can be modified using an API to programmatically introduce additional domain-specific training data or to make other modifications to the language model, such as expanding its vocabulary.

For example, the foundation language model may be a widely-available, pre-trained large language model (LLM) trained on a large corpus of training data such as LLaMA 2 or Mistral. The foundation language model is generally pre-trained using training data that is predominantly in a common, high-resource language that happens to be the source language. For example, some LLMs may be trained using training data that is predominantly English due to the relatively high availability of data. English may also be the source language for some applications.

Likewise, the foundation language model may have a vocabulary including a number of "tokens" based on words from the source language. In this context, "tokens" can refer to the units of text that the foundation language model can process and use to convert input text into a machine-readable format such as an embedded vector representation. Tokens can be groups of words or phrases, individual words, portions of words, characters, or the like.

Continuing the example method, a number of tokens based on words from the target language are added to the vocabulary of the foundation language model. For example, a selection of words from the target language can be tokenized and then added to the vocabulary of the foundation language model using a suitable application, library, toolkit, language model training tool, or application programming interface (API).

The foundation language model is then trained using a quantity of monolingual training data. For example, the monolingual training data may include books, articles, web pages, subtitles, dialog, and other textual data authored or spoken in the target language. The foundation language model is further trained using a quantity of parallel training data. As mentioned above, the parallel training data includes a number of parallel elements, each having one or more words in the source language and a corresponding one or more words in the target language. For example, a translation dictionary is an example of parallel training data that may be used in some examples.

In various examples, the steps described including, vocabulary expansion, monolingual fine-tuning, and parallel data fine-training, can be performed in any order. Importantly, the combination of at least these steps, can result in a fine-tuned language model with translation accuracy exceeding that of existing approaches. Some existing approaches underperformed because the language model vocabulary was too small to take advantage of large parallel training data sets.

Now, an expanded target language vocabulary coupled with focused fine-tuning using monolingual target language training enable the use of large amounts of high-quality parallel training data to expand the translation capabilities of the language model even further, with the target language vocabulary and translation accuracy improving as the amount of parallel training data is increased. In some examples, up to 20 million parallel elements or more including sentence pairs in the source and target languages can be beneficially used during fine-tuning of the foundation language model.

The innovations of the present disclosure provide significant improvements in the technical field of machine translation using ML models. Some existing approaches lacked the capability to utilize the potentially vast amount of parallel training data available for many target languages. Indeed, existing approaches suffered a decrease in accuracy and performance when the quantity of parallel training data used was increased past a relatively low threshold. Consequently, existing approaches, due to this limitation, lack the information that is potentially available when unbounded amounts of parallel training data can be used and are thus effectively limited in their ability to perform machine translation tasks. In addition, because existing approaches do not involve bolstering the foundation language model with additional tokenized vocabulary in the target language, they are similarly limited in their ability to internally represent the target language as embedded vectors.

In addition, the techniques disclosed herein can improve the functioning of the computing systems executing the machine translation services and language models. First and foremost, more accurate machine translation can lead to more reliable cross-border or cross-culture communication, reducing the computational overhead associated with language-related bottlenecks. For example, using existing approaches, the length or duration of video conferences or chat conversations may be needlessly extended due to translation-related delays. Additionally, through the fine-tuning techniques disclosed herein, the foundation language model can be quickly adapted to particular target languages or even specialized domains thereof, which can reduce the time and computational cost of customization. Moreover, higher accuracy in machine translation can eliminate the need for manual quality checking procedures by human translators is minimized, saving time and computational resources that would otherwise be required for corrections.

These illustrative examples are given to introduce the reader to the general subject matter discussed herein and the disclosure is not limited to these examples. The following sections describe various additional non-limiting examples of fine-tuning language models using target language vocabulary and parallel data for machine translation.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
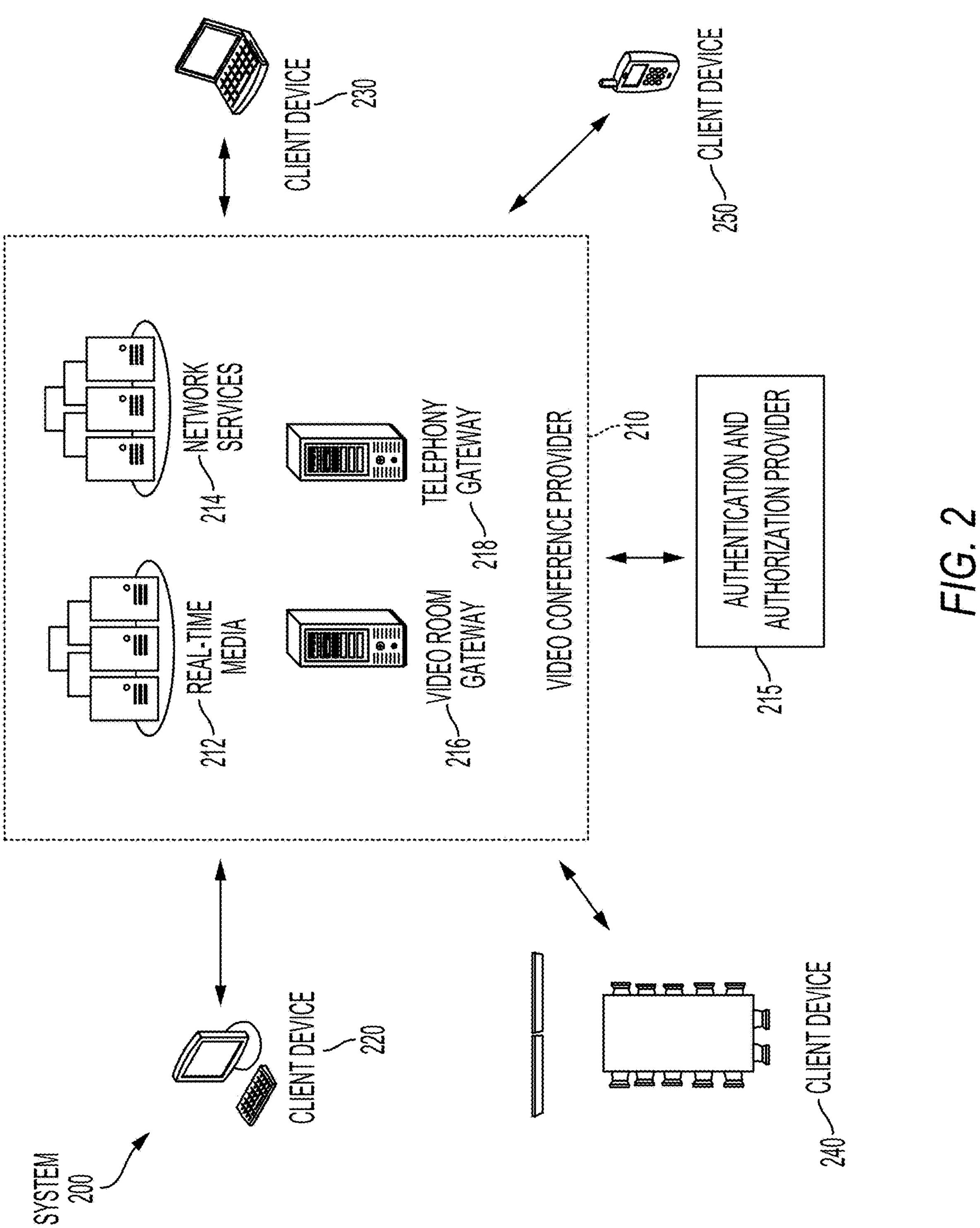
FIG. 2 shows an example system in which a video conference provider provides videoconferencing functionality to various client devices, according to some aspects of the present disclosure.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider

110. For example, a trusted entity may be a server operated by a business or other organization with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as two-factor authentication. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
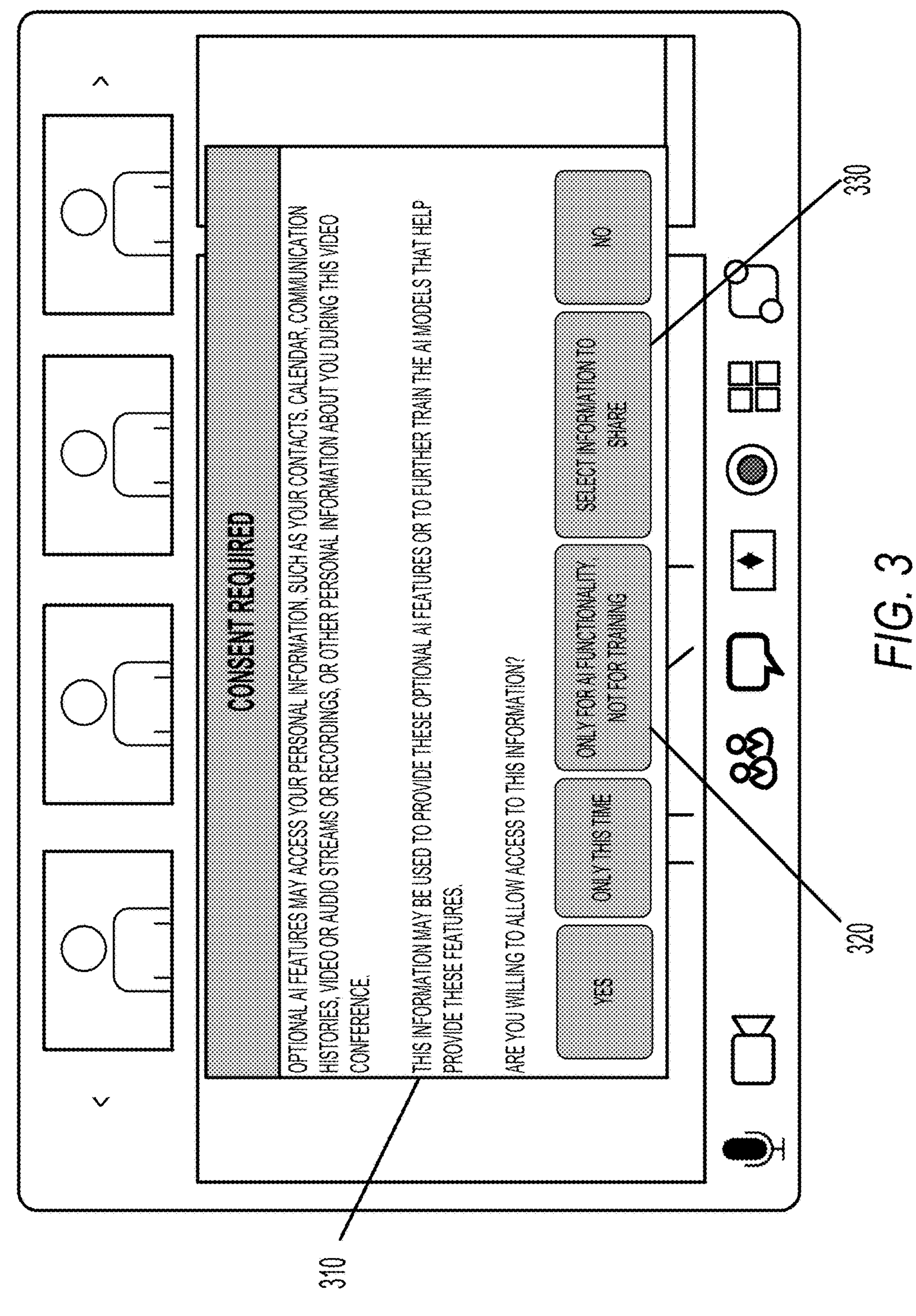
FIG. 3 shows an example user interface that may be used in some example systems configured for fine-tuning language models using target language vocabulary and parallel data for machine translation, according to some aspects of the present disclosure.

Turning next to FIG. 3, FIG. 3 shows an example user interface 300 that may be used in some example systems configured for fine-tuning language models using target language vocabulary and parallel data for machine translation, according to some aspects of the present disclosure. In some examples according to the present disclosure, a user may select an option to use one or more optional AI features available from the virtual conference provider 302. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to providing training data for the underlying AI models, the user may be provided with an option to consent, or deny consent, to access and use some or all of the user's personal information. In general, Zoom's goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default-account owners and administrators control whether to enable these AI features for their accounts, and if enabled, individual users may determine whether to provide consent to use their personal information.

As can be seen in FIG. 3, a user has engaged in a video conference and has selected an option to use an available optional AI feature. In response, the GUI has displayed a consent authorization window 310 for the user to interact with. The consent authorization window 310 informs the user that their request may involve the optional AI feature accessing multiple different types of information, which may be personal to the user. The user can then decide whether to grant permission or not to the optional AI feature generally, or only in a limited capacity. For example, the user may select an option 320 to only allow the AI functionality to use the personal information to provide the AI functionality, but not for training of the underlying AI models. In addition, the user is presented with the option 330 to select which types of information may be shared and for what purpose, such as to provide the AI functionality or to allow use for training underlying AI models.

Figure 4:
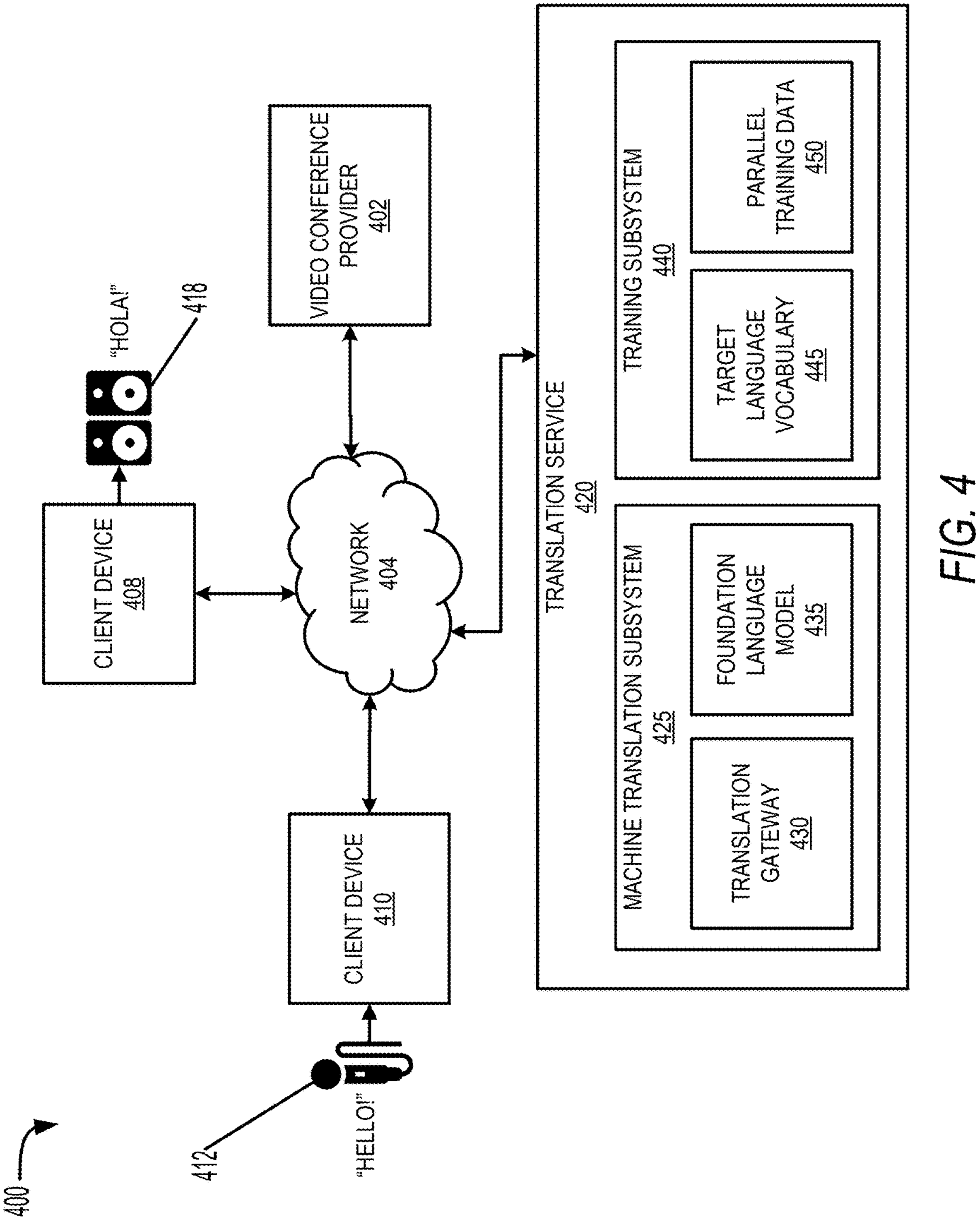
FIG. 4 shows an example of a system implementing some techniques for fine-tuning language models using target language vocabulary and parallel data for machine translation, according to some aspects of the present disclosure.

Referring now to FIG. 4, FIG. 4 shows an example of a system 400 implementing some techniques for fine-tuning language models using target language vocabulary and parallel data for machine translation, according to some aspects of the present disclosure. System 400 includes two client devices 408, 410 communicatively coupled with video conference provider 402 over a network 404. Network 404 may include the Internet, public networks, private networks, or combinations thereof. Video conference provider 402 is typically a server or collection of servers, including a combination of privately or cloud-hosted devices. Video conference provider 402 may be similar, in some respects, to the video conference providers 110, 210 described above with respect to FIGS. 1 and 2.

Client devices 408, 410 may be any type of device capable of executing the appropriate client software that may include machine translation functionality. The client devices 408, 410 may be laptops, desktops, smartphones, tablets, internet protocol (IP) phones, and so on. The client devices 408, 410 may execute, for example, video conference client software that interfaces with video conference provider 402 over network 404 to provide various communication services. The services may include video conferencing, chat messaging, telephony, calendaring, whiteboarding, email, and so on.

In some cases, client devices 408, 410 may require machine translation services during communication. For example, participants in a video conference may be speaking different languages. In another example, email thread participants may be emailing each other in different languages. In general, any communicative activity provided by the video conference provider 402, including oral and written forms of communication, may require machine translation services.

The video conference provider 402 or a standalone translation service 420 may include components for machine translation and in particular for fine-tuning language models using target language vocabulary and parallel data for machine translation.

In example system 400, client device 410 receives the spoken word "Hello!" from microphone 412. The word is output to the translation service 420 via network 404 and received from the machine translation subsystem 425. The translation subsystem 425 includes a foundation language model 435 that has been fine-tuned using the techniques disclosed herein. The foundation language model 435 is asked, using a suitable prompt, to translate the spoken word "Hello!" to Spanish.

For instance, the translation service 420 may include a component for generating a transcript (not shown) of the input to the microphone 412 which can then be used to generate the prompt. The transcript may be generated using an automatic speech recognition (ASR) system that can convert the spoken word to text. The ASR system may include one or more trained ML models and associated components for performing ASR, such as an encoder-decoder architecture including an autoencoder (AE) or variational autoencoder (VAE).

The foundation language model 435 then outputs the Spanish translation which is relayed to client device 408. The translated word, "Hola!" can be played back on the speakers 418 using a suitable text-to-speech synthesizer (not shown) to facilitate translated oral communication. The translation can likewise be shown in a chat message or other media for communicating words among client devices 408, 410. An example of a written translation using the techniques of the present disclosure is shown below in FIG. 5.

The foundation language model 435 may be, for example, an LLM based on a transformer architecture. The foundation language model 435 can be a pre-trained, "on-premise," hosted LLM or a commercially available, third-party LLM accessible using a suitable API. Examples of commercially available, cloud-based, third-party LLMs include OpenAI's GPT series, Google's Gemini models, Microsoft's Copilot, or Anthropic's Claude models. Examples of pre-trained, "on-premise," hosted LLMs include Meta's LLaMA 2-7B, OPT-7B, Falcon-7B, BLOOM-7B, Mistral-7B, or MPT-7B. Many other LLMs may be used, both hosted and cloud-based, in addition to the examples given here.

An important characteristic of the foundation language model 435 is that it is pre-trained using a base set of predominantly training data based on one language from using publicly available online sources. For instance, one popular foundation language model 435 is pre-trained using training data that is 90% in English, 8% programming code, and 2% in 22 other languages. The techniques of the present application may be particularly applicable when the source language is the language that the foundation language model is predominantly trained using.

In addition, the foundation language model 435 may include a number of APIs available to further train, fine-tune, or otherwise extend the foundation language model 435. For example, APIs may be available for token addition or classification, fine-tuning, and so on. In the present disclosure, the token addition API can be used to extend the vocabulary of the foundation language model 435 as described below.

Translation requests received by the translation service 420 may be passed to the machine translation subsystem 425 by way of a translation gateway 430. The translation gateway 430 may include components for prioritizing and queueing the translation requests. For example, "online" translation requests for in-progress meetings or active chat conversations may be designated with a higher priority than "offline" requests such as may be requested for the transcript of a completed video conference or a sent email. The translation gateway 430 can also include components for coordinating partial translations. For instance, some machine translation requests may be enqueued and translated as they are received and then assembled into sentences, paragraphs, or other logical groupings before being returned to the requester.

The translation service 420 also includes a training subsystem 440 that can be used to train or fine-tune the foundation language model 435. The training subsystem 440 may include components for generating prompts to train the foundation language model 435, to evaluate the responses, and to modify the model in accordance with the outcome of the training steps.

For fine-tuning, the training subsystem 440 includes training data such as the parallel training data 450. The parallel training data 450 can include a large number and variety of examples of words, phrases, sentences, paragraphs, etc. in the source language along with the translations of the respective words, phrases, sentences, paragraphs in the target language. The parallel training data 450 may be provided to the foundation language model 435 using a machine-readable, structured format such as a JSON or XML file, or it may be provided as a collection of natural language guidance. For example, one example instance of the parallel training data 450 may be a digital file or message that says, “The English phrase ‘the green cat’ is ‘el gato verde’ in Spanish.” The parallel training data 450 may include a large number of such examples. An important benefit of the techniques of the present disclosure is that improved translation accuracy can be obtained with additional parallel training data 450 beyond a relatively small quantity. Some existing approaches not only failed to obtain such an improvement, they have also demonstrated a declining translation accuracy with parallel training data 450 beyond a relatively low threshold number of parallel training data elements.

Various examples include a range of parallel training data elements in the parallel training data 450. The quantity of parallel training data may be chosen in accordance with the accuracy required for the particular translation use case. In general, the techniques of the present disclosure enable the use of any suitable amount of parallel training data. For instance, some examples may use thousands of elements, some examples may use millions of elements, some examples may use billions of elements, and so on.

The training subsystem 440 also includes target language vocabulary 445. The target language vocabulary 445 may include a quantity of words, portions of words, characters, or other elements of the target language that can be added to the vocabulary of the foundation language model 435. In this respect, the vocabulary of the foundation language model 435 can refer to the set of “tokens” used by the foundation language model 435 during the training and inference processes. The tokens may include groups of words, words, sub-words, special tokens (e.g., punctuation), or domain-specific tokens (e.g., mathematical symbols).

The tokens constituting the vocabulary of the foundation language model 435 can be used during both input processing and output generation. During input processing, source language input text can be tokenized into a sequence of tokens using the vocabulary of the foundation language model 435, which can then be converted into an embedded representation using an embedding matrix, a trained auto-encoder, a trained predictor model, or any other variety of trained neural network, or other suitable method for developing an embedded representation. During output generation, the trained and fine-tuned foundation language model 435 can generate a response using a sequence of tokens taken from its vocabulary, which can be concatenated to form the translation in the target language.

In some examples, the target language vocabulary 445 can be added to the vocabulary of the foundation language model 435 by first generating a number of tokens based on a set of words, sometimes referred to as a corpus, in the target language. For example, using a tokenization process, approximately 10 thousand target language words can be used to generate at least 10 thousand target language tokens. The tokenization process may involve application of a sub-word tokenization technique such as byte pair encoding (BPE), WordPiece, or SentencePiece to reduce the set of 10 thousand words into multi-word, single-word, or sub-word units or sequences.

The tokenization process may be performed using a trained ML model. For instance, a new BPE or SentencePiece model can be trained to generate the target language tokens. The trained ML model can be, for example, a neural network trained to recognize likely significant token patterns. The generated target language tokens can be checked for overlap or duplication with the existing foundation language model 435 vocabulary before adding the newly generated target language tokens.

The generated tokens can be added to the vocabulary of the foundation language model 435 using a suitable library or toolkit provided by the foundation language model 435 for adding new tokens or adding new tokens in bulk. For example, the generated tokens can be added to the vocabulary of the foundation language model 435 by extending a vocabulary file of the foundation language model 435. The vocabulary file may be a file that contains a list of the tokens in the vocabulary of the foundation language model 435. Following the addition of the generated tokens to the vocabulary file, the foundation language model 435 can be re-initialized using random embeddings based on the extended vocabulary file.

In some examples, the foundation language model 435 may be programmatically accessible as an object in program code such as a Python program. A method or function can be used, in association with the foundation language model object, to add a token or tokens to the vocabulary of the foundation language model 435. For example, the API of the foundation language model 435 may include (pseudo-code) methods such as “add_token(String)” or “add_tokens (String[ ])” that can be used to add to the vocabulary of the foundation language model 435.

In some examples, following the addition of new tokens to the vocabulary of the foundation language model 435, an embedding matrix associated with the foundation language model 435 may be resized. The embedding matrix may be used by the foundation language model 435 to map tokens in the model's vocabulary to a high-dimensional vector space prior to processing by other components or layers making up the foundation language model 435. For example, the new size of the embedding matrix may be determined by summing the existing number of tokens in the vocabulary of the foundation language model 435 with a count of number of target language tokens added. [Inventors: please review the last 3 paragraphs and confirm, or provide additional details about the language model vocabulary is expanded.]

Figure 5:
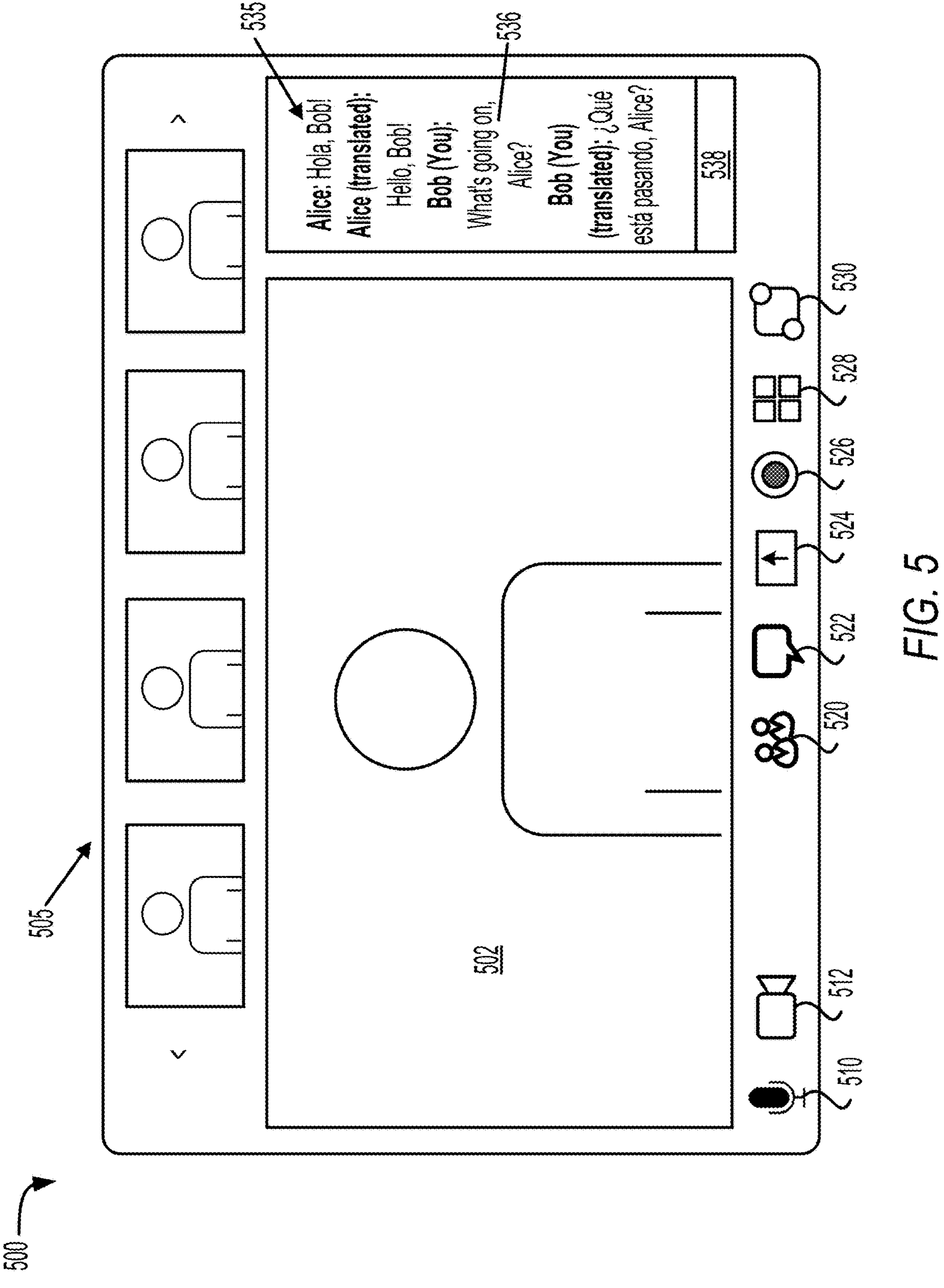
FIG. 5 shows an example of a user interface as may be seen on the display of a client device executing video conference client software using machine translation services including fine-tuning language models using target language vocabulary and parallel data for machine translation, according to some aspects of the present disclosure.

Referring now to FIG. 5, FIG. 5 shows an example of a user interface (UI) 500 as may be seen on the display of a client device executing video conference client software using machine translation services including fine-tuning language models using target language vocabulary and parallel data for machine translation, according to some aspects of the present disclosure.

The UI 500 depicts an in-progress video conference with a number of participants 505 shown at the top of the UI 500. The participants 505 displayed at the top of the UI 500 illustrate a particular display mode that a video conference participant may select, but the participants 505 may be displayed in various locations and numbers according to different modes. The example of FIG. 5 shows a typical “gallery” mode in which a main speaker window 502 is shown, emphasizing one speaker, along with the reminder of the participants 505 or a subset thereof shown in smaller, deemphasized UI elements. In “gallery” mode, the main speaker window 502 may show the participant that is currently speaking, that has been pinned or highlighted, a shared screen or other collaborative element, among other possibilities.

The UI 500 includes a number of controls, some examples of which are depicted at the bottom of the UI 500. The controls may include, for example, an audio settings control 510, a video settings control 512, a participants control 520, a chat application control 522, a screen share control 524, a record meeting control 526, a breakout rooms control 528, or an applications marketplace control 530. Many other examples are possible in various embodiments of the UI 500.

The UI 500 depicts the chat application 535 in a sidebar of the UI 500 during the video conference. The chat application 535 may be activated by, for example, selecting the chat application control 522. The chat application 535 includes a main chat window 536 including a display of, for example, a recent portion of the chat conversation among the participants 505. The chat application 535 also includes an input box 538 for the participant using the client device to enter and send chat messages.

The main chat window 536 depicts an example chat conversation that includes an application of machine translation. Another participant (Alice) sent a message in Spanish, which is shown translated in main chat window 536 into English. The response, typed by Bob in English, is then shown translated back into Spanish. In this example, the machine translation services may be provided by a translation service 420 using a foundation language model 435 using fine-tuning language models using target language vocabulary and parallel data for machine translation. This illustration also shows that the foundation language model 435 can be trained and fine-tuned to translate from a source language to a target language, and then from the target language back to the source language. In effect, a language can be both a source language and target language, depending on the training data used to pre-train the foundation language model 435 and the fine-tuning procedures applied thereafter.

Figure 6:
FIG. 6 shows a flowchart of an example method for fine-tuning language models using target language vocabulary and parallel data for machine translation, according to some aspects of the present disclosure.
Figure 6:
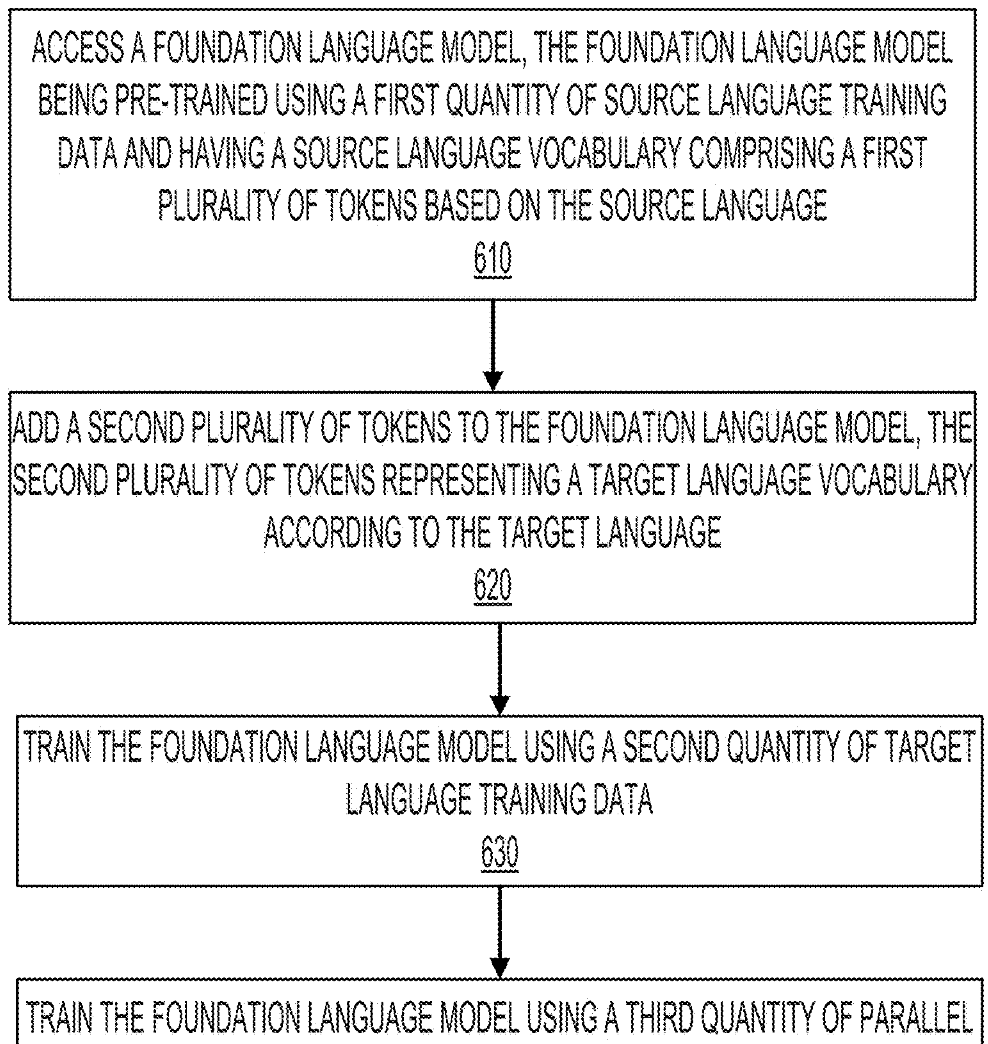

Referring now to FIG. 6, FIG. 6 shows a flowchart of an example method 600 for fine-tuning language models using target language vocabulary and parallel data for machine translation, according to some aspects of the present disclosure. The description of the method 600 in FIG. 6 will be made with reference to FIGS. 4-5, however any suitable system according to this disclosure may be used, such as the example systems 100 and 200, shown in FIGS. 1 and 2. It should be appreciated that method 600 provides a particular method for fine-tuning language models using target language vocabulary and parallel data for machine translation. Other sequences of operations may also be performed according to alternative examples. For example, alternative examples of the present disclosure may perform the steps outlined above in a different order. Moreover, the individual operations illustrated by method 600 may include multiple sub-operations that may be performed in various sequences as appropriate to the individual operation. Furthermore, additional operations may be added or removed depending on the particular applications.

Further, the operations described in method 600 may be performed by different devices. For example, the description is given from the perspective of the translation service 420 but other configurations are possible. One of ordinary skill in the art would recognize many variations, modifications, and alternatives. For example, the method 600 could be similarly performed by a client device 408, 410 or a component of the video conference provider 402.

The method 600 may include block 610. At block 610, a computing device accesses a foundation language model, such as foundation language model 435 described above with respect to FIG. 4. The foundation language model is pre-trained using a first quantity of training data in a particular language. The particular language and the source language may be the same language. In that case, the foundation language model may have a source language vocabulary including a first set of tokens based on the source language.

The foundation language model may be a widely-available, pre-trained large language model (LLM) trained on a large corpus of training data. For instance, some pre-trained models may be available for personal, research, or commercial use and can be deployed using local servers, remote servers, or cloud-based compute services. Examples of such models include OPT-7B, Falcon-7B, BLOOM-7B, MPT-7B, LLaMA-1-7B, LLaMA-2-7B, or Mistral-7B, among many others. In these identifiers, "7B" refers to the number of parameters in the pre-trained model, which can refer to the number of trainable weights and biases in the various model components. However, pre-trained models with any number of parameters may be used in various examples. Pre-trained models provided by third-parties as cloud-based LLMs such as the GPT series, Google Gemini, Anthropic Claude, and so on may also be used.

The foundation language model may be pre-trained using training data that is predominantly in a language that may be the source language. For instance, many examples are pre-trained using predominantly English training data due to the vast availability of English training data, both free and for purchase/licensing. Other languages commonly used as base languages for pre-trained models include Chinese, Spanish, French, German, Russian, or Arabic.

The foundation language model may have a "vocabulary." The vocabulary can refer to a set of words, tokens, or symbols that the model can process. The vocabulary may include groups or words, words, phrases, special characters, punctuation, or sub-word units. The sub-word units may be, for example, word fragments or byte pair encodings (BPEs), according to various examples. BPEs may include sub-word units that that include merged pairings of repeated, adjacent characters or symbols into a single symbol. Tokens including multiple words or phrases may be referred to as "n-grams." N-grams may include sequences of contiguous words, or portions thereof, considered as individual tokens.

The foundation language model vocabulary may consist of a number of tokens generated using a tokenization process, which can refer generally to the conversion of a word or text into a sequence of tokens, in which each token is an entry in the vocabulary. The tokens may be words, single words, subwords, or characters, or other units of language in accordance with the particular language. In some examples, the foundation language model can convert the tokens into a machine-readable format such as an embedded vector representation. For example, consider a simple vocabulary consisting of the elements of the phrase "What an elephant!" The vocabulary may be tokenized into the tokens: ["What", "an", "ele", "phant", "!"].

At block 620, the computing device adds a second set of tokens to the foundation language model representing a target language vocabulary according to the target language. For example, as was shown in FIG. 4 above, the target language vocabulary 445 can be added to the tokens constituting the vocabulary of the foundation language model 435 by first generating a number of tokens based on a set of words in the target language using a tokenization process. The generated tokens can then be added to the vocabulary of the foundation language model using a suitable API provided by the foundation language model 435 for adding new tokens or adding new tokens in bulk. In some examples, following the addition of new tokens to the vocabulary of the foundation language model 435, an embedding matrix associated with the foundation language model 435 may be resized. For example, consider a simple vocabulary consisting of the elements of a target language phrase, "Hola, ¿cómo estás?" The vocabulary may be tokenized into the tokens: ["Ho", "la", "," "¿", "cómo", "es", "tás", "?"]. These additional target language vocabulary tokens can be added to the foundation language model vocabulary using an API function or method such as an "add_token" method.

At block 630, the computing device trains the foundation language model using a second quantity of target language training data. In some examples, the second quantity of target language training data is monolingual, meaning it is entirely in the target language. For example, the monolingual training data may include books, articles, web pages, subtitles, dialog, and other textual data authored or spoken in the target language. The monolingual training data may be, for example, derived from a large set of languages including both the source and the target languages.

For instance, the input training data may be prompts including target language words or partial phrases or sentences that the foundational language model completes. The model output can be compared with the actual completed phrases or sentences. A loss can be determined based on the difference between the actual completion and the model output using a suitable loss function, and the loss can be used to update the parameters of the foundation language model using a suitable API. Other training methods, such as procedural methods provided by the language model or accessed using a suitable API, can be similarly used.

At block 640, the computing device trains the foundation language model using a third quantity of parallel training data including a number of parallel elements, in which each parallel element includes one or more words in the source language and a corresponding one or more words in the target language. The further training in this block can proceed similarly to the training process described in block 630.

In some examples, the parallel training data may be high-quality parallel training data. For example, the parallel training data can be generated using a manual translation process from the source language to the target language to minimize errors or inconsistencies due to machine or automated translations. In some examples, another trained ML model may be used to generate translations of a set of words, phrases, etc. from the source language to the target language, which may be more feasible when very large quantities of parallel training data is used where manual translation may be too costly or time consuming. In another example, the parallel training data may be filtered using a neural network trained to classify the accuracy of the target language translation for each parallel element. These and other methods may be used alone or in combination to ensure that the parallel training data is optimized.

In some examples, translation accuracy can be sensitive to method used for selection of high-quality parallel training data. For example, a semantic similarity-based score can be used to compare and rank the translations of the elements of the set of words, phrases, etc. from the source language to the target language. Then, high-quality parallel training data can be ensured by using only a portion of the higher ranked parallel training data elements.

As mentioned previously, the quantity of parallel training data may be chosen in accordance with the accuracy required for the particular translation use case. In general, the techniques of the present disclosure enable the use of any suitable amount of parallel training data. Translation accuracy may be sensitive to both the method used to generate the high-quality parallel training data as well as the number of elements used. If, for instance, a semantic similarity-based score is used to ranking parallel training data elements, then the number of elements may be selected from the ranked list, beginning with the first n elements, where n can range from thousands to millions or more, in accordance with the accuracy required for the particular translation use case. In some examples, the first 2n elements may be selected to diversify the parallel training data and to minimize the effects of elements that may not be improve the accuracy of the fine-tuned model (e.g., the English phrase "Alice (musician)" translated to the German phrase "Alice (musiker)").

In some examples, the techniques for fine-tuning a foundation language model using target language vocabulary and parallel data for machine translation can be used with multiple target languages. For example, a third set of tokens can be added to the foundation language model based on a second, third, etc. target language. Then, as before, the foundation language model can be trained using a quantity of the additional target language monolingual training data. The foundation language model can then be further trained using a quantity of parallel training data except now using the additional target language(s). These techniques can be used to add additional target languages individually or in combination. For instance, translation capabilities for multiple target languages can be added simultaneously in some examples.

The order of performance of blocks 620, 630, and 640 may vary according to various examples. For instance, some examples may begin with the pre-trained foundation language model (610), add the target vocabulary (620), and then perform the further training of blocks 630 and 640, performing block 630 and then 640 or 640 and then 630. Some other examples may begin with the pre-trained foundation language model (610), undergo the further monolingual training of block 630, add the target vocabulary (620), and then complete the further training of block 640. Other variations in the order of fine-tuning operations may be similarly used.

Figure 7:
FIG. 7 shows a flowchart of another example method for fine-tuning language models using target language vocabulary and parallel data for machine translation, according to some aspects of the present disclosure.
Figure 7:
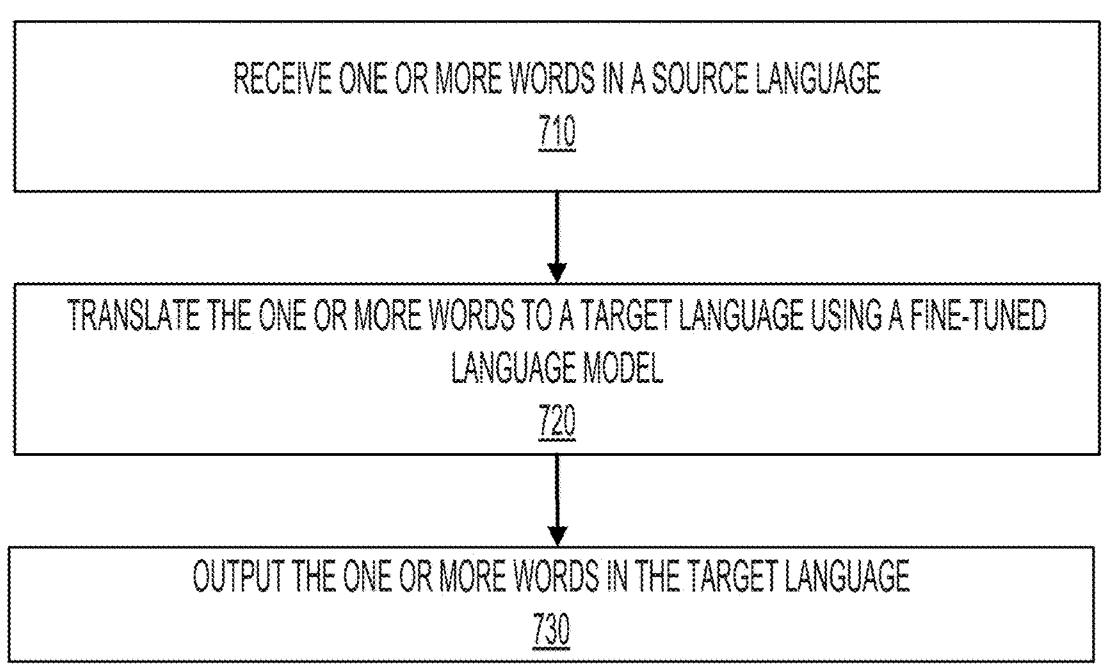

Referring now to FIG. 7, FIG. 7 shows a flowchart of another example method 700 for fine-tuning language models using target language vocabulary and parallel data for machine translation, according to some aspects of the present disclosure. The description of the method 700 in FIG. 7 will be made with reference to FIGS. 4-5, however any suitable system according to this disclosure may be used, such as the example systems 100 and 200, shown in FIGS. 1 and 2. It should be appreciated that method 700 provides a particular method for fine-tuning language models using target language vocabulary and parallel data for machine translation. Other sequences of operations may also be performed according to alternative examples. For example, alternative examples of the present disclosure may perform the steps outlined above in a different order. Moreover, the individual operations illustrated by method 700 may include multiple sub-operations that may be performed in various sequences as appropriate to the individual operation. Furthermore, additional operations may be added or removed depending on the particular applications. Further, the operations described in method 700 may be performed by different devices.

Further, the operations described in method 700 may be performed by different devices. For example, the description is given from the perspective of the translation service 420 but other configurations are possible. One of ordinary skill in the art would recognize many variations, modifications, and alternatives. For example, the method 700 could be similarly performed by a client device 408, 410 or a component of the video conference provider 402.

The method 700 may include block 710. At block 710, a computing device receives one or more words in a source language. The one or more words may be found, for example, among a number of words included in a text for translation. For example, if the foundation language model (e.g., the foundation language model 435 of FIG. 4) is an LLM, the source language word or words may be received or generated as a prompt for the LLM. For instance, the prompt may be "Translate the phrase 'Hello, how are you?' into Spanish." In some examples, the source language word or words can be input to the foundation language model using a suitable API. An example of an application using machine translation including fine-tuned language models using target language vocabulary and parallel data for machine translation is shown in FIG. 5 and the associated description. In that example, the source language word or words may be converted into a suitable prompt.

At block 720, the computing device translates the one or more words to a target language using a fine-tuned language model. For instance, the prompt of block 710 can be input to the fine-tuned foundation language model. The foundation language model can be fine-tuned using the method 600 described above with respect to FIG. 6. The foundation language model can be fine-tuned prior to use as part of a machine translation system implanting the steps in this method 700.

At block 730, the computing device outputs the one or more words in the target language. For example, the foundation language model may output, in response to the natural language prompt example of block 710, "Sure, in Spanish that would be 'Hola, ¿cómo estás?'" In some examples, the translation may be output using a suitable application or web-based API.

Figure 8:
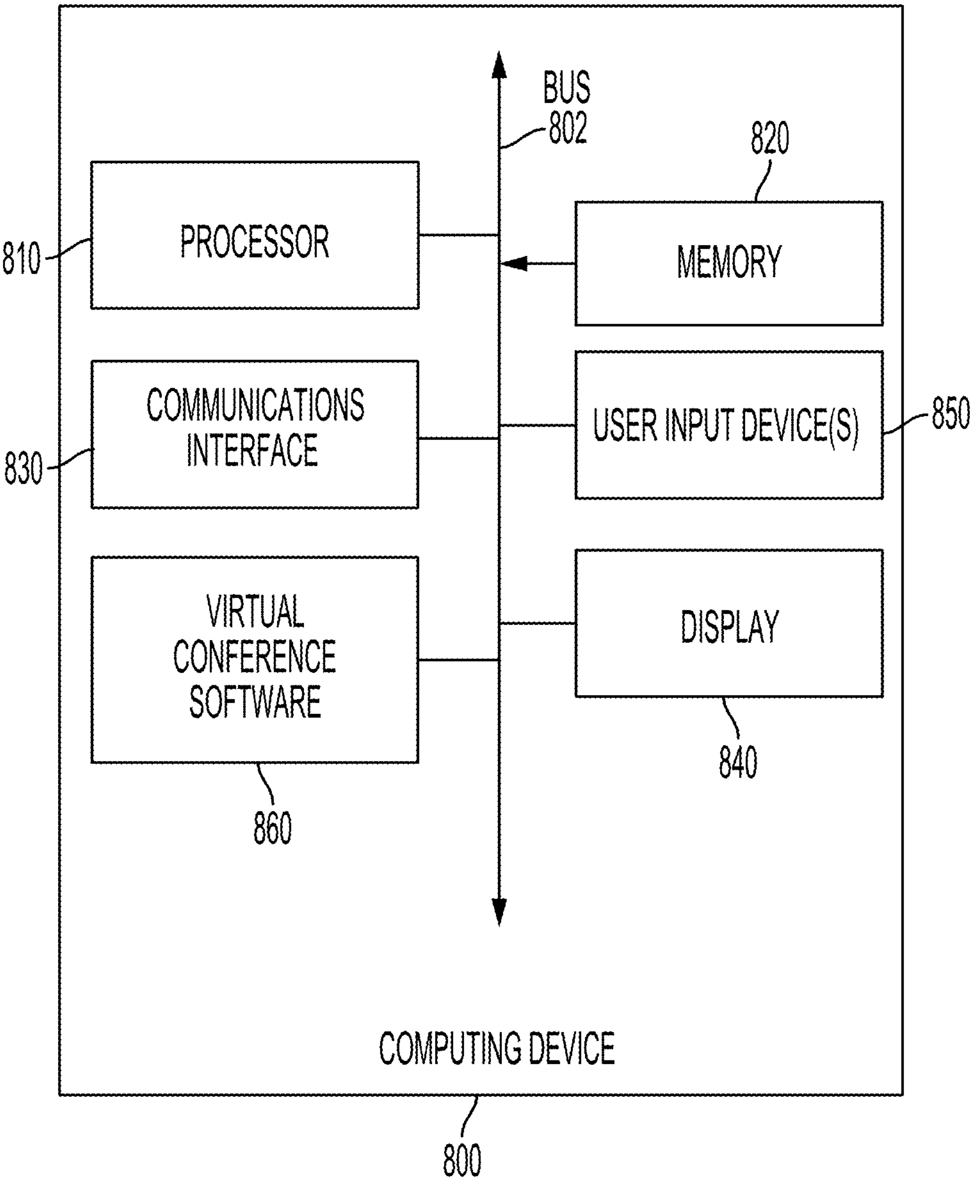
FIG. 8 shows an example computing device suitable for use in example systems or methods for fine-tuning language models using target language vocabulary and parallel data for machine translation, according to some aspects of the present disclosure.

Referring now to FIG. 8, FIG. 8 shows an example computing device 800 suitable for use in example systems or methods for fine-tuning language models using target language vocabulary and parallel data for machine translation, according to some aspects of the present disclosure. The example computing device 800 includes a processor 810 which is in communication with the memory 820 and other components of the computing device 800 using one or more communications buses 802. The processor 810 is configured to execute processor-executable instructions stored in the memory 820 to perform one or more methods for fine-tuning language models using target language vocabulary and parallel data for machine translation according to different examples, such as part or all of the example methods 600, 700 described above with respect to FIGS. 6 and 7. The computing device 800, in this example, also includes one or more user input devices 850, such as a keyboard, mouse, touchscreen, microphone, etc., to accept user input. The computing device 800 also includes a display 840 to provide visual output to a user.

In addition, the computing device 800 includes virtual conferencing software 860 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 800 also includes a communications interface 830. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a method, comprising: receiving one or more words in a source language; translating the one or more words to a target language using a fine-tuned language model, wherein the language model is fine-tuned by: accessing a foundation language model, the foundation language model being pre-trained using a first quantity of source language training data and having a source language vocabulary comprising a first plurality of tokens based on the source language; adding a second plurality of tokens to the foundation language model, the second plurality of tokens representing a target language vocabulary according to the target language; training the foundation language model using a second quantity of target language training data; and training the foundation language model using a third quantity of parallel training data, wherein the third quantity of parallel training data comprises a plurality of parallel elements, each parallel element comprising one or more words in the source language and a corresponding one or more words in the target language; and outputting the one or more words in the target language.

Example 2 is the method of example(s) 1, wherein adding the second plurality of tokens to the foundation language model comprises: generating the second plurality of tokens based on a set of words in the target language; adding the second plurality of tokens to the source language vocabulary; and resizing an embedding matrix associated with the language model using a sum of a first count of the first plurality of tokens and a second count of the second plurality of tokens.

Example 3 is the method of example(s) 1, wherein the foundation language model is a large language model based on a transformer architecture.

Example 4 is the method of example(s) 1, wherein the plurality of parallel elements includes at least 1 million elements.

Example 5 is the method of example(s) 1, wherein the plurality of parallel elements includes at least 10 million elements.

Example 6 is the method of example(s) 1, wherein: the third quantity of parallel training data is generated using a manual translation process from the source language to the target language; and the third quantity of parallel training data is filtered using a neural network trained to classify an accuracy of, for each parallel element, the one or more words in the target language.

Example 7 is the method of example(s) 1, wherein the language model is further fine-tuned by: adding a third plurality of tokens to the foundation language model, the third plurality of tokens representing a second target language vocabulary according to a second target language; training the foundation language model using a fourth quantity of second target language training data; and training the foundation language model using a fifth quantity of parallel training data, wherein the fifth quantity of parallel training data comprises a second plurality of parallel elements, each parallel element comprising one or more words in the source language and a corresponding one or more words in the second target language.

Example 8 is the method of example(s) 7, further comprising outputting the one or more words in the second target language.

Example 9 is a non-transitory computer-readable medium storing instructions that, when executed by one or more processors, cause the one or more processors to perform operations including: receiving one or more words in a source language; translating the one or more words to a target language using a fine-tuned language model, wherein the language model is fine-tuned by: accessing a foundation language model, the foundation language model being pre-trained using a first quantity of source language training data and having a source language vocabulary comprising a first plurality of tokens based on the source language; adding a second plurality of tokens to the foundation language model, the second plurality of tokens representing a target language vocabulary according to the target language; training the foundation language model using a second quantity of target language training data; and training the foundation language model using a third quantity of parallel training data, wherein the third quantity of parallel training data comprises a plurality of parallel elements, each parallel element comprising one or more words in the source language and a corresponding one or more words in the target language; and outputting the one or more words in the target language.

Example 10 is the non-transitory computer-readable medium of example(s) 9, wherein adding the second plurality of tokens to the foundation language model comprises: generating the second plurality of tokens, the second plurality of tokens comprising a set including words, portions of words, or characters based on the set of words in the target language; adding the second plurality of tokens to the source language vocabulary; and resizing an embedding matrix associated with the language model using a sum of a first count of the first plurality of tokens and a second count of the second plurality of tokens.

Example 11 is the non-transitory computer-readable medium of example(s) 9, wherein the foundation language model is a large language model based on a transformer architecture.

Example 12 is the non-transitory computer-readable medium of example(s) 9, wherein the plurality of parallel elements includes at least 20 million elements.

Example 13 is the non-transitory computer-readable medium of example(s) 9, wherein the second plurality of tokens includes at least 10 thousand tokens.

Example 14 is the non-transitory computer-readable medium of example(s) 9, wherein the parallel elements each include a sentence in the source language and the corresponding sentence in translated into the target language.

Example 15 is a system comprising: one or more processors; and one or more computer-readable storage media storing instructions which, when executed by the one or more processors, cause the one or more processors to perform operations including: receiving one or more words in a source language; translating the one or more words to a target language using a fine-tuned language model, wherein the language model is fine-tuned by: accessing a foundation language model, the foundation language model being pre-trained using a first quantity of source language training data and having a source language vocabulary comprising a first plurality of tokens based on the source language; adding a second plurality of tokens to the foundation language model, the second plurality of tokens representing a target language vocabulary according to the target language; training the foundation language model using a second quantity of target language training data; and training the foundation language model using a third quantity of parallel training data, wherein the third quantity of parallel training data comprises a plurality of parallel elements, each parallel element comprising one or more words in the source language and a corresponding one or more words in the target language; and outputting the one or more words in the target language.

Example 16 is the system of example(s) 15, wherein: generating the second plurality of tokens, the second plurality of tokens comprising a set including words, portions of words, or characters based on the set of words in the target language; adding the second plurality of tokens to the source language vocabulary; and resizing an embedding matrix associated with the language model using a sum of a first count of the first plurality of tokens and a second count of the second plurality of tokens.

Example 17 is the non-transitory computer-readable medium of example(s) 15, wherein the foundation language model is a large language model based on a transformer architecture.

Example 18 is the non-transitory computer-readable medium of example(s) 15, wherein the plurality of parallel elements includes at least 100 million elements.

Example 19 is the non-transitory computer-readable medium of example(s) 15, wherein the language model is further fine-tuned by: adding a third plurality of tokens to the foundation language model, the third plurality of tokens representing a second target language vocabulary according to a second target language; training the foundation language model using a fourth quantity of second target language training data; and training the foundation language model using a fifth quantity of parallel training data, wherein the fifth quantity of parallel training data comprises a second plurality of parallel elements, each parallel element comprising one or more words in the source language and a corresponding one or more words in the second target language, and further comprising the operation of outputting the one or more words in the second target language.

Example 20 is the non-transitory computer-readable medium of example(s) 9, wherein the parallel elements each include a sentence in the source language and the sentence in the target language.

That which is claimed is:

1. A method, comprising:

receiving one or more words in a source language;

translating the one or more words to a target language using a fine-tuned language model, wherein the language model is fine-tuned by:

accessing a foundation language model, the foundation language model being pre-trained using a first quantity of source language training data and having a source language vocabulary comprising a first plurality of tokens based on the source language;

adding a second plurality of tokens to the foundation language model, the second plurality of tokens representing a target language vocabulary according to the target language;

training the foundation language model using a second quantity of target language training data; and training the foundation language model using a third quantity of parallel training data, wherein the third quantity of parallel training data comprises a plurality of parallel elements, each parallel element comprising one or more words in the source language and a corresponding one or more words in the target language; and outputting the one or more words in the target language.

2. The method of claim 1, wherein adding the second plurality of tokens to the foundation language model comprises:

generating the second plurality of tokens based on a set of words in the target language;

adding the second plurality of tokens to the source language vocabulary; and resizing an embedding matrix associated with the language model using a sum of a first count of the first plurality of tokens and a second count of the second plurality of tokens.

3. The method of claim 1, wherein the foundation language model is a large language model based on a transformer architecture.

4. The method of claim 1, wherein the plurality of parallel elements includes at least 1 million elements.

5. The method of claim 1, wherein the plurality of parallel elements includes at least 10 million elements.

6. The method of claim 1, wherein:

the third quantity of parallel training data is generated using a manual translation process from the source language to the target language; and the third quantity of parallel training data is filtered using a neural network trained to classify an accuracy of, for each parallel element, the one or more words in the target language.

7. The method of claim 1, wherein the language model is further fine-tuned by:

adding a third plurality of tokens to the foundation language model, the third plurality of tokens representing a second target language vocabulary according to a second target language;

training the foundation language model using a fourth quantity of second target language training data; and training the foundation language model using a fifth quantity of parallel training data, wherein the fifth quantity of parallel training data comprises a second plurality of parallel elements, each parallel element comprising one or more words in the source language and a corresponding one or more words in the second target language.

8. The method of claim 7, further comprising outputting the one or more words in the second target language.

9. A non-transitory computer-readable medium storing instructions that, when executed by one or more processors, cause the one or more processors to perform operations including:

receiving one or more words in a source language;

translating the one or more words to a target language using a fine-tuned language model, wherein the language model is fine-tuned by:

accessing a foundation language model, the foundation language model being pre-trained using a first quantity of source language training data and having a source language vocabulary comprising a first plurality of tokens based on the source language;

adding a second plurality of tokens to the foundation language model, the second plurality of tokens representing a target language vocabulary according to the target language;

training the foundation language model using a second quantity of target language training data; and training the foundation language model using a third quantity of parallel training data, wherein the third quantity of parallel training data comprises a plurality of parallel elements, each parallel element comprising one or more words in the source language and a corresponding one or more words in the target language; and outputting the one or more words in the target language.

10. The non-transitory computer-readable medium of claim 9, wherein adding the second plurality of tokens to the foundation language model comprises:

generating the second plurality of tokens, the second plurality of tokens comprising a set including words, portions of words, or characters based on a set of words in the target language vocabulary;

adding the second plurality of tokens to the source language vocabulary; and resizing an embedding matrix associated with the language model using a sum of a first count of the first plurality of tokens and a second count of the second plurality of tokens.

11. The non-transitory computer-readable medium of claim 9, wherein the foundation language model is a large language model based on a transformer architecture.

12. The non-transitory computer-readable medium of claim 9, wherein the plurality of parallel elements includes at least 20 million elements.

13. The non-transitory computer-readable medium of claim 9, wherein the second plurality of tokens includes at least 10 thousand tokens.

14. The non-transitory computer-readable medium of claim 9, wherein the parallel elements each include a sentence in the source language and the corresponding sentence translated into the target language.

15. The non-transitory computer-readable medium of claim 9, wherein the parallel elements each include a sentence in the source language and the sentence in the target language.

16. A system comprising:

one or more processors; and one or more computer-readable storage media storing instructions which, when executed by the one or more processors, cause the one or more processors to perform operations including:

receiving one or more words in a source language;

translating the one or more words to a target language using a fine-tuned language model, wherein the language model is fine-tuned by:

accessing a foundation language model, the foundation language model being pre-trained using a first quantity of source language training data and having a source language vocabulary comprising a first plurality of tokens based on the source language;

adding a second plurality of tokens to the foundation language model, the second plurality of tokens representing a target language vocabulary according to the target language;

training the foundation language model using a second quantity of target language training data; and training the foundation language model using a third quantity of parallel training data, wherein the third quantity of parallel training data comprises a plurality of parallel elements, each parallel element comprising one or more words in the source language and a corresponding one or more words in the target language; and outputting the one or more words in the target language.

17. The system of claim 16, wherein:

generating the second plurality of tokens, the second plurality of tokens comprising a set including words, portions of words, or characters based on the set of words in the target language;

adding the second plurality of tokens to the source language vocabulary; and resizing an embedding matrix associated with the language model using a sum of a first count of the first plurality of tokens and a second count of the second plurality of tokens.

18. The system of claim 16, wherein the foundation language model is a large language model based on a transformer architecture.

19. The system of claim 16, wherein the plurality of parallel elements includes at least 100 million elements.

20. The system of claim 16, wherein the language model is further fine-tuned by:

adding a third plurality of tokens to the foundation language model, the third plurality of tokens representing a second target language vocabulary according to a second target language;

training the foundation language model using a fourth quantity of second target language training data; and training the foundation language model using a fifth quantity of parallel training data, wherein the fifth quantity of parallel training data comprises a second plurality of parallel elements, each parallel element comprising one or more words in the source language and a corresponding one or more words in the second target language, and further comprising the operation of outputting the one or more words in the second target language.

* * * * *